United States Patent Office 3,549,611
Patented Dec. 22, 1970

3,549,611
4-(2'- OR 4'-PYRIDYLETHYLAMINO)-AZOBENZENE DYES
Rudolf Altermatt, Tecknau, and Curt Mueller, Binningen, Switzerland, assignors to Sandoz Ltd., Basel, Switzerland
No Drawing. Continuation-in-part of application Ser. No. 481,384, Aug. 20, 1965. This application Oct. 8, 1969, Ser. No. 864,896
Claims priority, application Switzerland, Aug. 28, 1964, 11,324/64
Int. Cl. C09b *29/36;* D06p *1/18*
U.S. Cl. 260—156               12 Claims

ABSTRACT OF THE DISCLOSURE

Disperse dyes of the 4-(2'- or 4'-pyridyl-ethyl-amino)-azobenzene series yield extremely fast dyeings on fibers and fiber materials made of fully synthetic or semi-synthetic high molecular organic materials of hydrophobic character. Fastness properties include fastness to heat-setting, sublimation, pleating, gas fumes, ozone, cross-dyeing, dry-cleaning, lubricants, chlorine and wet treatments.

---

This application is a continuation-in-part of application Ser. No. 481,384, filed Aug. 20, 1965, and now abandoned.

The present invention provides new, substantially water-insoluble dyestuffs of the formula

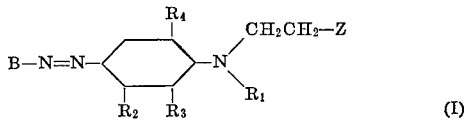
(I)

wherein

B is phenyl substituted with from one to three substituents selected from the group consisting of chloro, bromo, lower alkoxy, cyano, nitro, lower alkylsulfonyl and di (lower alkyl) aminosulfonyl; or a nitronaphthyl radical;

$R_1$ is hyrogen, lower alkyl, lower hydroxyalkyl, lower cyanoalkyl, lower alkanoyloxyalkyl, lower choroalkanoyloxyalkyl, lower hydroxyalkanoyloxyalkyl, lower cyanoalkanoyloxyalkyl, lower alkoxycarbonyloxyalkyl, lower acetylalkyl, lower acetylalkanoyloxyalkyl, lower cyanoalkoxyalkyl, lower phenylaminocarbonyloxyalkyl or methoxycarbonylethyl;

$R_2$ is hydrogen, lower alkyl, lower alkoxy, formylamino, lower alkanoylamino, lower chloroalkanoylamino, lower hydroxyalkanoylamino, lower alkoxycarbonylamino or lower alkylsulfonylamino;

$R_3$ is hydrogen, lower alkyl or lower alkoxy;

$R_4$ is hydrogen or lower alkoxy and

Z is 2-pyridyl or 4-pyridyl.

The term "lower" says that the respective alkyl group contains 1 to 4, preferably 1 or 2 carbon atoms.

For the manufacture of the new dyestuffs of this invention an aminoazo dyestuff of the formula

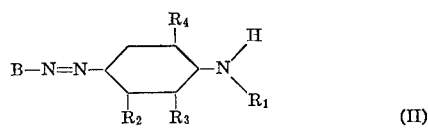
(II)

is reacted with a 2- or 4-vinyl-pyridine of the formula $$CH_2=CH-Z \qquad (III)$$

or the diazonium compound from an amine of the formula $$B-NH_2 \qquad (IV)$$

is reacted with a coupling component of the formula

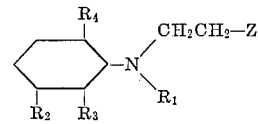
(V)

The known aminoazo dyestuffs of Formula II are reacted with a vinylpyridine of Formula III in analogy with the processes described in J. Am. Chem. Soc. 77, 4913, 5434, (1955), J. Am. Chem. Soc. 78, 4127, (1956) or J. prakt. Chemie (4), 4, 19, (1956).

The reaction with a vinylpyridine of the Formula III can be performed in a particularly advantageous manner in the liquid phase, frequently with advantage in the presence of a saturated fatty acid containing 1 to about 5 carbon atoms, for example formic, acetic, propionic, butyric or isobutyric acid; of an alkyl ester, such as ethyl acetate of ethyl propionate; of an anhydride, for example acetic or propionic anhydride; of a heavy-metal salt, such as copper, zinc, cobalt or nickel formate or acetate; of a monohydric or polyhydric alcohol, for example ethyleneglycol or glycerol; or of a phenol, such, for example, as phenol, meta-cresol, para-cresol or a cresol mixture; or of water.

When both reactants used are liquid, the reaction may be performed without a solvent, in the presence of about 0.1% to 10% of one of the aforementioned additives, or a solvent or diluent may be additionally used. Suitable solvents are large amounts of the aforementioned additives, provided they are liquid, or other inert liquids, for example aromatic hydrocarbons which may contain halogen atoms or nitro or alkoxy groups. When solid reactants are used, it is especially useful to add such a solvent. The reaction temperature is most advantageously chosen within the range from about 20° to 150° C., preferably from 50° to 130° C. When 100% acetic acid is used, the reaction is most advantageously performed at 50° to 120° C. Under the conditions described the reaction takes a few hours.

According to the second variant of the present process, a coupling component on which the aminoazo dyestuffs of the Formula II are based, that is to say an amine of the formula

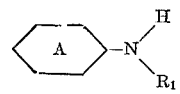

is reacted in the manner described above with a compound of the Formula III and the reaction product of the Formula V is coupled in the usual manner with a diazonium compound from an amine of the Formula IV, for example in an acid medium (which may be buffered) while cooling, for example at 0° to 5° C.

The dyestuffs obtained are valuable new disperse dyestuffs. It is especially advantageous to convert them in known manner into dyestuff preparations prior to their use. For this purpose they are disintegrated until their average particle size is about 0.01 to 10μ, especially about 0.1 to 5μ. This disintegration may be carried out in the presence of a dispersant of filler. For example, the dried dyestuff is grounded together with a dispersant, if desired or required in the presence of a filler, or kneaded with a dispersant to form a paste and then dried under vacuum or spray-dried. When a suitable proportion of water is added to a preparation manufactured in this manner, it may be used for dyeing or padding from a dilute liquor or for printing.

For dyeing from dilute liquors there are generally used up to about 50 g. of dyestuff per litre, for padding up to about 150 g. per litre, preferably up to 100 g. per litre, and for printing up to about 150 g. per kilogram of printing paste. The goods-to-liquor ratio may vary within wide limits, for example from 1:3 to 1:200, preferably from 1:3 to 1:80.

From an aqueous suspension the new dyestuffs are absorbed very well by mouldings from fully synthetic or semisynthetic organic substances of high molecular weight. They lend themselves especially well for dyeing, padding or printing fibres, filament or fleeces, woven or knitted fabrics from polyesters, cellulose-2½-acetate or cellulose triacetate. They are also suitable for dyeing synthetic polyamides, polyolefins, acrylonitrile polymers and polyvinyl compounds. Particularly valuable dyeings are obtained on linear aromatic polyesters. These esters are in general polycondensates from terephthalic acid and glycols, especially ethyleneglycol. On these materials they are easy to apply. They show rapid dyeing, good migration (levelling), and are capable of producing deep colours, i.e. their build up properties are very good.

Dyeing follows the usual practice: Polyester fibres can be dyed in the presence of carriers at temperatures from about 80° C. to 125° C. or in the absence of carriers under superatmospheric pressure at about 100° to 140° C. by the exhaustion method. Furthermore, polyester fibres may be padded, impregnated or printed with aqueous dispersions of the new dyestuffs, the dyestuffs being heat-set on the impregnated material at about 140° to 230° C., for example with the aid of steam or air. In the particularly favourable temperature range from 180° to 220° C. the dyestuffs diffuse rapidly into the polyester fibre without subsequent sublimation, even when the material under treatment is exposed to such a temperature for a prolonged period. In the manner the objectionable fouling of the dyeing apparatus is prevented. Cellulose-2½-acetate is preferably dyed bewteen about 65° and 80° C. and cellulose triacetate at a temperature of up to about 115° C. The most advantageous pH range is from 2 to 9, especially from 4 to 8. The absorption rate of cellulose-2½-acetate, cellulose triacetate and polyesters for the new dyestuffs is excellent and is hardly affected by a preliminary heat-setting or stretching of the polyester fibres.

As a rule, the usual dispersants, which are preferably anionic or nonionic and may also be used in the form of mixtures of two or more, are added. About 0.5 g. of dispersant per litre of dyestuff preparation will generally suffice though larger amounts, for example up to about 3 g. per litre, may be used equally well. Known anionic dispersants suitable for use in the present process are, for example, condensates from naphthalenesulphonic acids and formaldehyde, especially dinaphthylmethanedisulphonates, esters of sulphonated succinic acid, Turkey red oil and alkali metal salts of sulphuric acid esters of fatty alcohols, for example sodium laurylsulphate, sodium cetylsulphate, sulphite cellulose waste liquor or alkai meta salts thereof, soaps or alkali metal sulphates of monoglycerides of fatty acids. Examples of known and particularly suitable nonionic dispersants are the adducts of about 3 to 40 mols of ethylene oxide with alkylphenols, fatty alcohols or fatty amines and neutral sulphuric acid esters thereof.

In padding and printing the conventional thickeners may be used, for example modified or unmodified natural products, for example alginates, British gum, gum arabic, crystal gum, locust bean flour, tragacanth, carboxymethyl cellulose, hydroxyethyl cellulose, starches or synthetic products, for example polyacrylamides or polyvinyl alcohols.

The dyeings obtained are extremely fast, for example outstandingly fast to heat-setting, sublimation, pleating gas fumes, ozone, crossdyeing, dry-cleaning, lubricants, chlorine, and wet treatments, being, for example, fast to water, sea water, washing and perspiration.

Reserve effects on wool and cotton are good, as is the suitability for discharge printing. The fastness to light is very good, even in dainty shades so that the new dyestuffs may also be used with advantage as mixing components for the production of fashionable pastel shades. Some of the dyestuffs obtained by the present invention are fast to boiling and reduction at temperatures of up to at least 220° C., and especially a 80° to 140° C.; this stability is not impaired within the pH range from 4 to 10 by the goods-to-liquor ratio used or by the presence of dyeing accelerators. By virtue of their stability these new dyestuffs are particularly suitable for dyeing polyester/cotton blend fabrics by the single-bath method in combination with substantive reactive dyestuffs.

In the molecular structure of the disperse dyes according to this invention each azo nitrogen atom is directly bound to a ring carbon atom of an aromatic, e.g. phenyl or naphthyl, nucleus. Parts and percentages in the following examples are by weight.

EXAMPLE 1

A mixture of 23.4 parts of 4-vinylpyridine, 24.2 parts of N-ethylaminobenzene and 12 parts of acetic acid of 100% strength is stirred for 6 hours at 110° C., whereupon the acetic acid, the excess 4-vinylpyridine and any residual N-ethyl-aminobenzene are distilled off under a pressure of 15 mm. Hg at 70° C. The N-ethyl-N-[2'-(4''-pyridyl) - ethyl] - aminobenzene obtained in this manner is sufficiently pure for the manufacture of the dyestuff.

In the meantime a diazo solution is prepared in the following manner: 17.2 parts of 1 - amino - 2 - chloro-4-nitro-benzene in a mixture of 60 parts of water and 40 parts of concentrated hydrochloric acid are stirred for 3 hours at room temperature. The resulting suspention is cooled by adding 100 parts of ice and diazotized at 0° to 5° C. within 2 hours with a solution of 6.9 parts of sodium nitrite in 100 parts of water. The batch is stirred on for 15 minutes, whereupon the resulting solution is mixed with 10 parts of aminosulphonic acid and filtered. A solution of 22.6 parts of N-ethyl-N-[2'-(4''-pyridyl) - ethyl] - aminobenzene in 50 parts of glacial acetic acid is added to the clear diazonium salt solution and the coupling reaction is finalized in the acid medium by adding sodium acetate until a pH value of 4 has been reached. The dyestuff is suctioned off, washed free from acid and dried. After having been recrystallized from ethanol, it melts at 117° C.; it corresponds to the formula

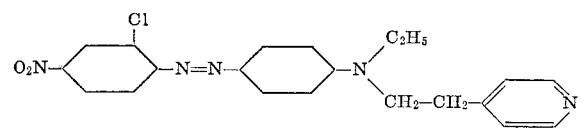

and dyes polyester fibres red shades having good properties of fastness.

It is not absolutely necessary to isolate the N-ethyl-[2'-(4''-pyridyl)-ethyl]-aminobenzene.

Instructions for use 7 parts of the dyestuff obtained in Example 1, 4 parts of sodium dinaphthylmethandisulphonate, 4 parts of sodium cetylsulphate and 5 parts of anhydrous sodium sulphate are ground to a fine powder for 48 hours in a ball mill. 2 parts of the dyeing preparation thus obtained are dispersed in 3000 parts of water containing 3 parts of a 30% solution of a highly sulphonated castor oil and 20 parts of an emulsion of a chlorinated benzene in water. 100 parts of polyester fibre fabric ("Dacron," registered trademark) are immersed at 20 to 25° C. in the dyebath which is then heated within about 30 minutes to 95 to 100° C. and dyeing is carried on for 1 hour at 95 to 100° C. The fabric is then taken out of the bath, washed, soaped for 15 minutes at 70° C. with a solution of 0.1% strength of an alkylphenyl polyglycol ether, once more washed and dried. The resulting ruby red dyeing possesses good properties of fastness.

When dyeing is performed in a high-temperature dyeing apparatus at 120° to 130° C., the carrier may be dispensed with.

EXAMPLE 2

13.8 parts of 1-amino-4-nitrobenzene are diazotized in a mixture of 60 parts of water, 40 parts of concentrated hydrochloric acid and 100 parts of ice at 0° to 5° C. by adding 25 parts of 4 N sodium nitrite solution. The batch is stirred on for 15 minutes, 5 parts of aminosulphonic acid are added and the whole is filtered. The filtrate is mixed with a solution of 25.5 parts of 1 - acetylamino - 3 - [2'-(4''-pyridyl)-ethyl]-aminobenzene in 100 parts of hydrochloric acid of 15% strength, and the coupling reaction is finalized in an acid medium by adding sodium acetate until a pH value of 2 has been reached. The resulting dyestuff is suctioned off, washed free from acid and dried. After recrystallization from a mixutre of alcohol and dioxane it melts at 225.5° C. It dyes polyester fibres brilliant yellowish red shades having good properties of fastness.

EXAMPLE 3

120 parts of concentrated sulphuric acid are mixed at 60° to 70° C. with 6.9 parts of powdered sodium nitrite while stirring vigorously. The bath is stirred further for 10 minutes at 60° C., then cooled to 10° C., and at 10° to 20° C. 100 parts of glacial acetic acid and then 16.3 parts of 1-amino - 2 - cyano - 4 - nitrobenzene and 100 parts of glacial acetic acid are added. The batch is stirred for 2 hours and the resulting diazonium salt solution is then poured into a mixture of 300 parts of ice and water. The excess sodium nitrite is then decomposed with aminosulphonic acid. The batch is filtered and at 0° to 5° C. a solution of 25.1 parts of N-2-cyanethyl-N-[2' - (4'' - pyridyl) - ethyl]-aminobenzene in 100 parts of glacial acetic acid is added, whereupon sodium acetate is added to establish a pH value of 2.5.

The dyestuff thus formed is suctioned off, washed free from acid and dried; after recrystallization from chlorobenzene it melts at 191° C. It dyes cellulose-2½-acetate, cellulose triacetate and polyesters fast reddish brown shades.

EXAMPLE 4

When the diazonium salt prepared as described in Example 3 is mixed with a solution of 25.1 parts of N-2-cyanethyl - N - [2' - (2''-pyridyl)-ethyl]-aminobenzene in 100 parts of glacial acetic acid, a dyestuff is obtained which, after recrystallization from n-butanol, melts at 169° C. It dyes polyester fibres red shades having good properties of fastness.

EXAMPLE 5

13.8 parts of 1 - amino - 4 - nitrobenzene are diazotized at 0° to 5° C. in a mixture of 60 parts of water, 40 parts of concentrated hydrochloric acid and 100 parts of ice by slowly adding 25 parts of a 4 N sodium nitrite solution. To decompose any excess nitrite, 5 parts of aminosulphonic acid are added and the resulting diazonium salt solution is added to a solution of 22.6 parts of N-ethyl-N - [2' - (4'' - pyridyl)-ethyl]-aminobenzene in 300 parts of an acetic acid solution of 40% strength. The dyestuff formed is suctioned off, washed free from acid and dried; after recrystallization from a mixture of alcohol and dioxane it melts at 177° C. It dyes acetate rayon scarlet shades which have good fastness to light.

The identical dyestuff can also be obtained in the following manner: 48 parts of 4-vinylpyridine are added at 50° C. to a solution of 24.2 parts of 4-nitro-4'-ethylamino - 1,1' - azobenzene in 73 parts of glacial acetic acid, 390 parts of methanol and 95 parts of acetone. The mixture is kept for 1 hour at 50° C. and then heated for 6 hours at 90° C., allowed to cool and the precipitate is filtered off.

The following table contains further dyestuffs of the Formula I:

TABLE

| Ex. No. | B | $R_1$ | $R_2$ | $R_3$ | $R_4$ | Z | Shade on polyester |
|---|---|---|---|---|---|---|---|
| 6 | 4-nitrophenyl | $-C_2H_5$ | H | H | H | 2-pyridyl | Red. |
| 7 | Same as above | $-C_2H_5$ | $-CH_3$ | H | H | Same as above | Do. |
| 8 | do | $-C_2H_4OH$ | H | H | H | 4-pyridyl | Scarlet. |
| 9 | do | $-C_2H_4CN$ | H | H | H | 2-pyridyl | Reddish orange. |
| 10 | do | H | H | H | H | do | Red. |
| 11 | do | $-C_2H_4OH$ | H | H | H | Same as above | Do. |
| 12 | 2-chloro-4-nitrophenyl | $-C_2H_5$ | H | H | H | do | Ruby red. |
| 13 | Same as above | $-CH_3$ | $-NH-CO-CH_3$ | H | H | 4-pyridyl | Red. |
| 14 | do | $-C_2H_4CN$ | H | H | H | Same as above | Reddish orange. |
| 15 | do | H | $-NH-CO-C_2H_5$ | H | H | do | Red. |
| 16 | do | $-C_2H_4OCOCH_3$ | $-CH_3$ | H | H | 2-pyridyl | Do. |
| 17 | do | $-C_2H_4CN$ | $-CH_3$ | H | H | 2-pyridyl | Scarlet. |
| 18 | do | $-C_2H_4CN$ | $-CH_3$ | H | H | 4-pyridyl | Ruby red. |
| 19 | 2-cyano-4-nitrophenyl | $-C_2H_4CN$ | $-NH-CO-CH_3$ | H | H | Same as above | Violet. |
| 20 | Same as above | H | $-CH_3$ | H | H | do | Red. |
| 21 | do | $-C_2H_5$ | $-CH_3$ | $-CH_3$ | H | 2-pyridyl | Ruby red. |
| 22 | do | $-C_2H_5$ | H | H | H | 2-pyridyl | Violet. |
| 23 | do | $-C_2H_5$ | $-CH_3$ | $-CH_3$ | H | 4-pyridyl | Red. |
| 24 | 2-methylsulphonyl-4-nitrophenyl | Same as above | H | H | H | 2-pyridyl | Ruby red. |
| 25 | 2-bromo-4,6-dinitrophenyl | do | $-NH-CO-CH_3$ | H | H | 4-pyridyl | Reddish blue. |
| 26 | 2,4-dinitro-6-methylsulphonylphenyl | $-C_2H_4OCOCH_2CN$ | do | H | H | 2-pyridyl | Blue. |
| 27 | Same as above | H | $-NHCOCH_3$ | $-OCH_3$ | $-OCH_3$ | 4-pyridyl | Do. |
| 28 | 2-chloro-4,6-dinitrophenyl | $-C_2H_4OH$ | $-NH-CO-CH_3$ | H | $-OC_2H_5$ | do | Do. |
| 29 | do | $-C_2H_4OH$ | $-NH-CO-CH_3$ | H | $-OC_2H_5$ | Same as above | Red. |
| 30 | 2-chloro-4-methyl-sulphonylphenyl | H | $-NH-CO-CH_3$ | $-OCH_3$ | H | do | Violet. |
| 31 | 2,4-dinitro-phenyl | Same as above | H | H | $-OCH_3$ | do | Red. |
| 32 | 2,4-bis-(methylsulphonyl)-phenyl | $-C_3H_5$ | H | H | H | 4-pyridyl | Scarlet. |
| 33 | 2,5-dichloro-4-dimethylaminosulphonyl-phenyl | Same as above | H | H | H | do | Orange. |
| 34 | Same as above | do | H | H | H | Same as above | do |
| 35 | 2-methoxy-4-nitro-phenyl | $-C_2H_4OCOC_2H_5$ | H | H | H | do | Scarlet. |

TABLE—Continued

| Ex. No. | B | R₁ | R₂ | R₃ | R₄ | Z | Shade on polyester |
|---|---|---|---|---|---|---|---|
| 36 | 2,5-dicyano-phenyl | —C₂H₅ | H | H | H | 4-pyridyl | Scarlet. |
| 37 | 5-chloro-2-cyano-phenyl | —C₂H₅ | H | H | H | Same as above | Do. |
| 38 | 2,4-dinitro-phenyl | —C₄H₉ | —CH₃ | H | H | do | Ruby Red. |
| 39 | 4-nitro-naphthyl-1 | —C₄H₉ | —CH₃ | H | H | do | Do. |
| 40 | 2-bromo-4-nitro-phenyl | —C₂H₅ | H | H | H | do | Do. |
| 41 | 4-nitro-phenyl | H | —NH—CO—CH₃ | H | H | do | Red. |
| 42 | 2,4-cyano-4-nitro-phenyl | —C₂H₄OCOCH₃ | H | H | H | do | Blue. |
| 43 | 4-nitro-phenyl | —C₄H₉ | —OCH₃ | H | —OCH₃ | do | Do. |
| 44 | Same as above | Same as above | —OCH₃ | —CH₃ | —OCH₃ | do | Violet. |
| 45 | do | do | H | H | H | do | |
| 46 |  | —C₂H₅ | —NH—CHO | H | H | 2-pyridyl | Scarlet. |
| 47 |  | —C₂H₅ | H | H | H | Same as above | Do. |
| 48 | 2-cyano-4-nitrophenyl | —C₂H₄OCOOCH₃ | H | H | H | do | Red. |
| 49 | Same as above | —C₂H₄COOCH₃ | H | H | H | do | Do. |
| 50 | do | Same as above | —CH₃ | H | H | do | Ruby red. |
| 51 | 2-chloro-4-nitrophenyl | do | —CH₃ | H | H | do | Red. |
| 52 | Same as above | —C₂H₄OCOOC₂H₅ | H | H | H | do | Do. |
| 53 | do | —C₂H₄COCH₃ | H | H | H | do | Do. |
| 54 | do | Same as above | —CH₃ | H | H | 4-pyridyl | Ruby red. |
| 55 | do | do | —CH₃ | H | —OCH₃ | Same as above | Violet. |
| 56 | do | —C₂H₄OCOCH₂COCH₃ | H | H | H | do | Blue. |
| 57 | do | —C₂H₄OCOC₂H₄CN | H | H | H | 2-pyridyl | Red. |
| 58 | do | | H | H | H | do | Ruby red. |
| 59 | do | —C₂H₄OCONH— | H | H | H | Same as above | Red. |
| 60 | 2-methylsulphonyl-4-nitrophenyl | H | —NH—SO₂—CH₃ | H | H | do | Ruby red. |
| 61 | Same as above | H | —NH—COO—CH₃ | H | H | do | Do. |
| 62 | do | H | —NH—COOC₂H₅ | H | H | do | Do. |
| 63 | do | H | —NH—CO—CH₂—CH₂Cl | H | H | do | Do. |
| 64 | do | H | —NH—CO—CH₂—CH₂OH | H | H | do | Do. |
| 65 | 2-bromo-4,6-dinitrophenyl | H | —NH—SO₂—CH₃ | H | H | do | Blue. |
| 66 | Same as above | H | Same as above | H | H | 4-pyridyl | Do. |
| 67 | do | H | —NH—CO—C₃H₇ | H | H | Same as above | Do. |
| 68 | do | H | —NH—COO—CH₃ | H | H | do | Do. |
| 69 | do | H | —NH—COH | H | H | do | Do. |
| 70 | 4-nitrophenyl | —C₄H₉ | —NH—COH | H | —OC₂H₅ | do | Red. |
| 71 | Same as above | —C₄H₉ | —NH—COOH | H | H | 2-pyridyl | Ruby red. |
| 72 | do | —C₂H₄OCOCH₂OH | H | H | —OC₂H₅ | Same as above | Scarlet. |
| 73 | do | —C₂H₄OCOCH₂Cl | H | H | H | do | Do. |

Formulae of representative dyestuffs of the foregoing examples are as follows:

EXAMPLE 1

EXAMPLE 2

EXAMPLE 3

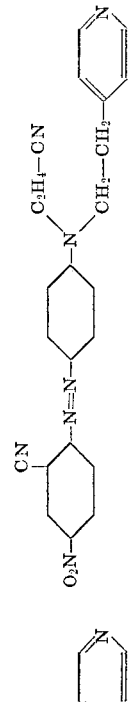

EXAMPLE 4
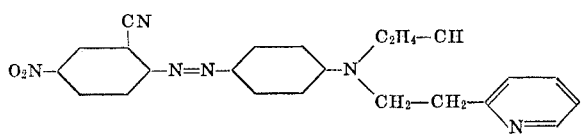

EXAMPLE 5
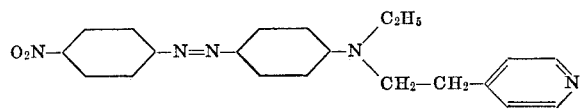

EXAMPLE 9
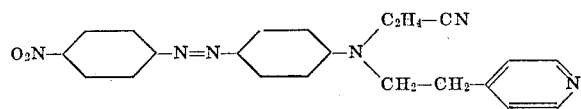

EXAMPLE 17
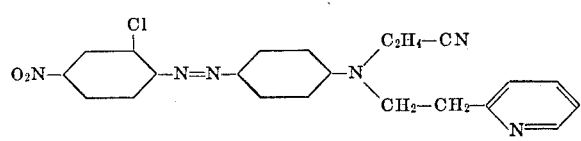

EXAMPLE 19
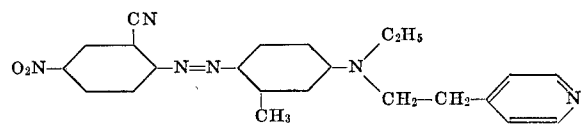

EXAMPLE 24
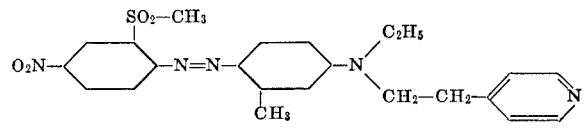

EXAMPLE 26
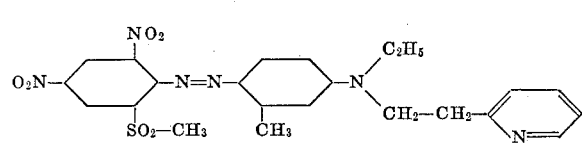

EXAMPLE 43
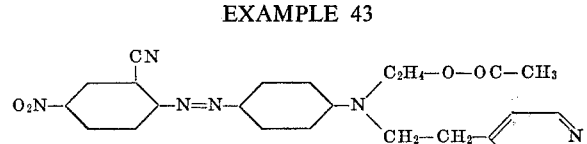

Having thus disclosed the invention what we claim:
1. Substantially water-insoluble dyestuff of the formula

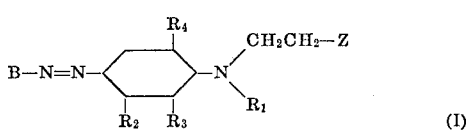

wherein

B is phenyl substituted with from one to three substituents, each substituent being a member selected from the group consisting of chloro, bromo, lower alkoxy, cyano, nitro, lower alkylsulfonyl and di(lower alkyl)aminosulfonyl; or nitronaphthyl;

$R_1$ is hydrogen, lower alkyl, lower hydroxyalkyl, lower cyanoalkyl, lower alkanoyloxy(lower)alkyl, lower chloroalkanoyloxy(lower)alkyl, lower hydroxyalkanoyloxy(lower)alkyl, lower cyanoalkanoyloxy(lower) alkyl, lower alkoxycarbonyloxy(lower)alkyl, lower acetylalkyl, lower acetylalkanoyloxy(lower)alkyl, lower cyanoalkoxy(lower)alkyl, lower phenylaminocarbonyloxyalkyl or methoxycarbonylethyl;

$R_2$ is hydrogen, lower alkyl, lower alkoxy, formylamino, lower alkanoylamino, lower chloroalkanoylamino, lower hydroxyalkanoylamino, lower alkoxycarbonylamino or lower alkylsulfonylamino;

$R_3$ is hydrogen, lower alkyl or lower alkoxy;
$R_4$ is hydrogen or lower alkoxy and
Z is 2-pyridyl or 4-pyridyl.

2. Dyestuff according to claim 1 of the formula
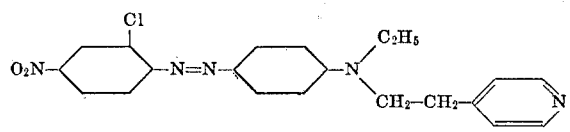

3. Dyestuff according to claim 1 of the formula
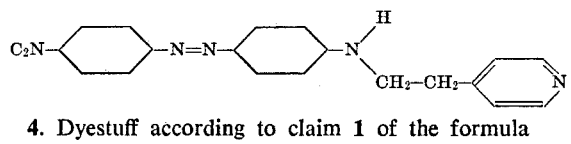

4. Dyestuff according to claim 1 of the formula
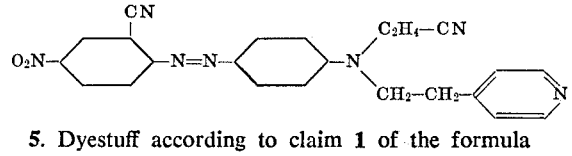

5. Dyestuff according to claim 1 of the formula
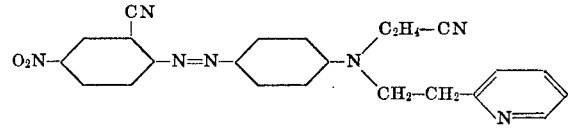

6. Dyestuff according to claim 1 of the formula
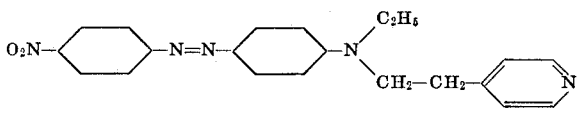

7. Dyestuff according to claim 1 of the formula
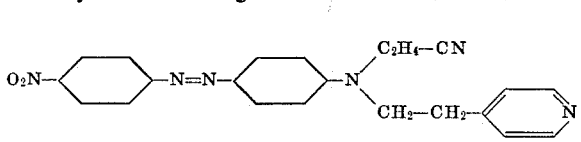

8. Dyestuff according to claim 1 of the formula
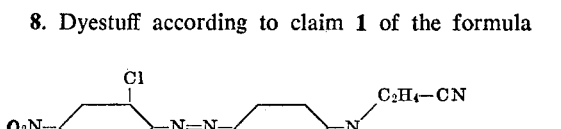

9. Dyestuff according to claim 1 of the formula
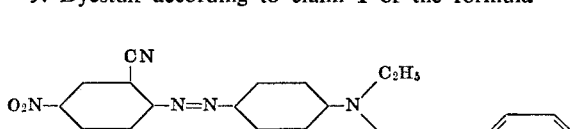

10. Dyestuff according to claim 1 of the formula
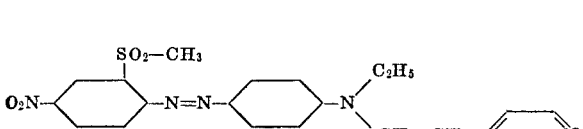

11. Dyestuff according to claim 1 of the formula
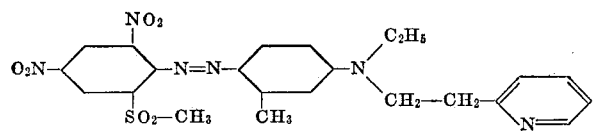
12. Dyestuff according to claim 1 of the formula
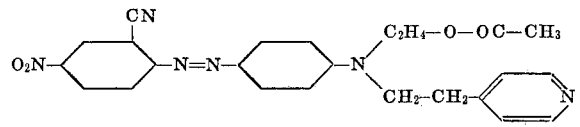
References Cited
UNITED STATES PATENTS
| | | | |
|---|---|---|---|
| 2,234,723 | 3/1941 | Dickey et al. | 260—156 |
| 2,830,043 | 4/1958 | Merian | 260—207.1 |
| 3,268,507 | 8/1966 | Kruckenberg | 260—207 |
FLOYD D. HIGEL, Primary Examiner
U.S. Cl. X.R.
8—4, 41, 50, 71; 117—138.8, 143, 144; 260—37, 41, 205, 207.1, 290, 294.1, 295, 296